United States Patent [19]
Grabenkort

[11] Patent Number: 5,493,774
[45] Date of Patent: Feb. 27, 1996

[54] METHOD AND APPARATUS FOR ASSEMBLING CONTAINERS

[75] Inventor: Richard W. Grabenkort, Barrington, Ill.

[73] Assignee: Abbott Laboratories, Abbott Park, Ill.

[21] Appl. No.: 338,353

[22] Filed: Nov. 14, 1994

Related U.S. Application Data

[63] Continuation of Ser. No. 9,601, Jan. 27, 1993, abandoned.

[51] Int. Cl.[6] .............................. B23P 21/00; B23P 19/04
[52] U.S. Cl. .................... 29/773; 29/240.5; 29/281.1; 29/281.5; 29/778; 29/283
[58] Field of Search ............................ 29/281.1, 281.5, 29/283, 778, 773, 240, 240.5; 53/490

[56] References Cited

U.S. PATENT DOCUMENTS

| | | | |
|---|---|---|---|
| 1,553,738 | 9/1925 | Arey | 29/773 X |
| 3,045,337 | 7/1962 | Martin | 29/773 |
| 4,726,535 | 2/1988 | Snyder | 29/240 X |
| 4,939,890 | 7/1990 | Peronek et al. | 53/490 X |
| 4,980,969 | 1/1991 | Marchesini | 29/773 |

FOREIGN PATENT DOCUMENTS

| | | | |
|---|---|---|---|
| 109999 | 10/1917 | United Kingdom | 29/240 |

*Primary Examiner*—Joseph M. Gorski
*Attorney, Agent, or Firm*—T. M. Breininger; H. G. Thibault; A. N. Trausch

[57] ABSTRACT

A process and apparatus are provided for assembling two, mating, threaded containers. The threaded end of the first container is disposed in the threaded port of the second container. The second container is clamped to prevent rotation of the second container. A cam is rotated to engage a torque-applying assembly to produce relative movement between the clamp assembly and the torque-applying assembly. This effects sequential engagement and disengagement of the torque-applying assembly and the first container. The torque-applying assembly is rotated relative to the clamp assembly while engaged with the first container to effect threaded engagement of the containers.

10 Claims, 8 Drawing Sheets

METHOD AND APPARATUS FOR ASSEMBLING CONTAINERS

This application is a continuation application based on prior application Ser. No. 08/009,601 filed on Jan. 27, 1993 and now abandoned.

TECHNICAL FIELD

The present invention relates to the assembly of two mating containers. More particularly, this invention relates to a system in which one container is threadingly engaged with another container. The invention is particularly well-suited for use in assembling a diluent bag container and a medicament container in the form of a smaller vial.

BACKGROUND OF THE INVENTION

Systems have been developed for packaging a medicament in a small vial and packaging a diluent in a separate, larger container. The vial and larger container can be subsequently connected together at the time of use, or earlier, for convenient safe mixing of the medicament and the diluent. By preparing such mixtures just prior to use, the problems attendant to the deterioration of mixtures having a short shelf life are avoided.

Such dual container systems are disclosed in the Abbott Laboratories, Inc. U.S. Pat. Nos. 4,614,267, 4,614,515, and 4,757,911. These systems typically include a diluent container in the form of an I. V. bag containing a standard diluent, such as a normal saline solution or dextrose. The diluent bag is provided for subsequent connection to a selected medicament container, such as a vial, containing the appropriate medicament in accordance with the individual prescription. In such a system, the additive medicament, which may be a solid (powder) or liquid, is added as a precise, predetermined, quantity into a precise quantity of diluent.

The diluent container has a port to which the medicament container (e.g., small vial) may be connected. Typically, the port in the diluent container includes internal threads, and the medicament container has one end with external threads for matingly engaging the diluent container port threads.

In order to maintain sterility of the medicament container and diluent container in the pre-assembled condition during shipping, storing, and handling, the medicament container is provided with a primary stopper and secondary closure or cover at its threaded end. Also, the diluent container is similarly provided with an internal plug inside the port and a secondary closure or cover over the port.

When the medicament container is to be threadingly engaged with the diluent container, the secondary closures are removed. However, the contents of the medicament container remain sealed within the container by the stopper, and the diluent container port remains occluded by the internal plug. As the medicament container and diluent container are screwed together, the outer end of the medicament container stopper is engaged by the outer end of the diluent container plug.

When it is desired to mix the medicament with the diluent, the flexible walls of the diluent container bag can be pushed in to allow the diluent container plug to be pulled further inwardly inside the bag and out of the port, and this necessarily pulls the engaged stopper out of the medicament container. The engaged plug and stopper then drop together inside the diluent container bag to the bottom of the bag.

Proper use of the dual container, reconstituted, drug system requires that the threaded engagement between the medicament container and the diluent container be properly established. In particular, the amount of threaded engagement must be sufficient to ensure the proper internal engagement between the medicament container stopper and the diluent container plug. Further, the threaded engagement between the medicament container and the diluent container must be sufficient to ensure a good, liquid-tight seal between the two containers.

With this type of dual container system, the proper threaded engagement is established by applying a predetermined, minimum torque. For example, in the above-identified Abbott Laboratories' system, the preferred minimum torque is about 10 inch-pounds. Typically, a user of the system, such as a pharmacist or nurse in a hospital, manually holds the diluent container (e.g., I. V. bag) in one hand while screwing the smaller, medicament container or vial into the port of the diluent container with the other hand.

Threading the two containers together with a final torque of about 10 inch-pounds requires some amount of effort. If a number of dual container systems must be assembled consecutively in a short period of time, one person may find the task to be somewhat tiring, and the muscles in the person's arms, hands, and fingers may become temporarily fatigued.

Thus, it would be desirable to provide a system that would permit a person to assemble such dual container systems without requiring such tiring procedures. The system should also preferably function in a manner that would minimize, if not eliminate, the possibility of trauma associated with repetitive motion when a person improperly attempts such procedures or performs such procedures for an inordinately long time.

Further, it would be advantageous if such an improved system could accommodate assembly of the containers with a predetermined torque and could function effectively to consistently provide the same, final torque to each dual container assembly.

It would also be beneficial if such an improved system could be operated relatively rapidly so as to accommodate assembly of the dual container units at a relatively high rate. This would accommodate high volume applications, such as in hospital pharmacies, wherein many such dual container units may be assembled each day.

It would also be desirable to provide an improved assembly system which would provide evidence of insufficient threaded engagement between the two containers and which would facilitate continued assembly of the two containers or reassembly as may be necessary.

Further, it would be advantageous to provide an assembly system that functions substantially automatically, with a minimum amount of human intervention, at a relatively low cost.

Finally, it would be desirable to provide an improved assembly system that operates in a manner which is consistent with, or which enhances, aseptic or sterile procedures.

The present invention provides a container assembly process and apparatus which can accommodate designs having the above-discussed benefits and features.

SUMMARY OF THE INVENTION

One aspect of the present invention relates to a novel method or process for assembling two, mating, threaded containers in a substantially automatic manner. The process permits the threaded coupling of two containers in a manner that consistently results in a threaded engagement at a predetermined torque level. Further, the process effectively couples the two containers together to provide a good, leak-tight seal in a manner that does not require significant human intervention or procedures which could lead to muscle fatigue.

The process is especially suitable for container assemblies wherein one of the containers has a flexible, bag portion. Not only does the process accommodate a flexible, and even irregularly shaped, container, but the process produces a fully coupled engagement between two mating containers in a relatively short time. Thus, the improved process of the present invention is especially suitable for use in high volume applications, such as in hospital pharmacies, where many container units may be assembled each day.

In a preferred form of the process, a medicament container having a threaded end is disposed in the threaded receiving port of a diluent container. This may be done manually by placing the medicament container threaded end in the diluent container port. Typically, however, the medicament container is also manually turned slightly (e.g., about ¼ turn) to initially engage the threads.

The diluent container, with the medicament container disposed thereon, is then gripped in a clamp assembly on a frame to prevent rotation of the diluent container relative to the frame.

A cam is rotated to engage a torque-applying assembly for producing relative axial displacement between the clamp assembly and the torque-applying assembly to effect sequential engagement and disengagement of the torque-applying assembly and the medicament container.

The torque-applying assembly is rotated relative to the frame while engaged with the medicament container to effect threaded engagement of the two containers. In the preferred embodiment, the torque-applying assembly includes a motor designed to provide a desired torque and includes a control system to terminate the threading process when that torque level is reached.

Preferably, the process automatically releases the clamp assembly grip on the diluent container after it has been properly coupled to the medicament container, and the completed assembly is automatically ejected from the clamp assembly.

Another aspect of the present invention relates to an apparatus in which a clamp assembly is mounted on a frame for operation between (1) a closed configuration to grip the diluent container and prevent rotation thereof and (2) an open configuration to release the diluent container.

A torque-applying assembly is disposed on the frame for engaging and rotating the medicament container in the port of the diluent container while the diluent container is gripped by the clamp assembly.

The apparatus includes an operator, such as a motor, for rotating a cam to engage the torque-applying assembly and produce relative movement between the toque-applying assembly and the frame to effect the sequential engagement and disengagement of the torque-applying assembly and the medicament container.

Another aspect of the present invention relates to a process and apparatus for holding a diluent container that has a laterally extending flange around the threaded receiving port into which the medicament container is screwed. In particular, a platform extends from a frame to define a support surface for receiving the diluent container flange. The platform defines a recess for receiving a portion of the diluent container extending below the flange.

A gripping arm is pivotally mounted to the frame and has a gripper end and a cam follower end. An operator, such as a motor, rotates the cam to engage the gripping arm cam follower end and pivot the arm from (1) a release position in which the gripper end is spaced away from the diluent container flange to (2) a clamping position in which the gripper end presses the diluent container flange against the platform support surface.

In a preferred embodiment, the gripping arm is biased to normally pivot toward the release position. The arm is pivoted in the opposite direction to the clamping position when the cam rotates a receiving recess surface away from the gripping arm cam follower end and engages the gripping arm cam follower end with a constant radius surface defining a major portion of an arc of a circle.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same.

DESCRIPTION OF THE PREFERRED EMBODIMENT

While this invention is susceptible of embodiment in many different forms, this specification and the accompanying drawings disclose only one specific form as an example of the invention. The invention is not intended to be limited to the embodiment so described, however. The scope of the invention is pointed out in the appended claims.

For ease of description, the apparatus of this invention is described in the normal (upright) operating position, and terms such as upper, lower, horizontal, etc., are used with reference to this position. It will be understood, however, that the apparatus of this invention may be manufactured, stored,, transported, and sold in an orientation other than the position described.

Some of the figures illustrating the embodiment of the apparatus show conventional components, structural details, and mechanical elements that will be recognized by one skilled in the art. However, the detailed descriptions of such elements are not necessary to an understanding of the invention, and accordingly, are not herein presented.

The present invention provides a novel system which is especially suitable for assembling a threaded medicament container and a threaded diluent container in a manner that can provide a predetermined torque to insure a good, liquid-tight seal. The system permits a person to assemble such containers without requiring tiring procedures. The system accommodates high volume applications, such as in hospital pharmacies, wherein many such dual container units may be assembled each day. The system functions substantially automatically, with a minimum amount of human intervention, at a relatively low cost. The system operates in a manner which is consistent with, and which enhances aseptic or sterile procedures.

Figure 1:
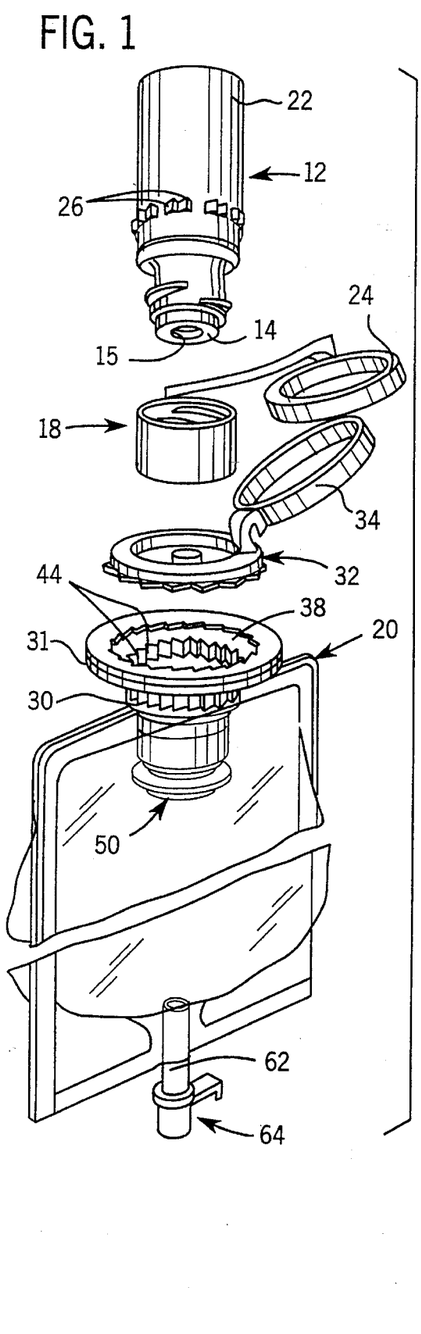
FIG. 1 is a exploded, perspective view of a medication delivery system that includes a medicament-containing vial and a diluent-containing bag.
Figure 2:
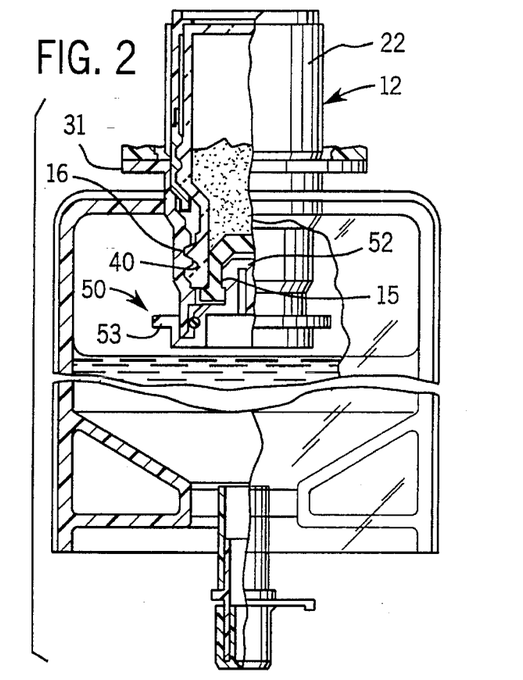
FIG. 2 is a fragmentary, side elevational view in partial cross section showing the medicament-containing vial threadingly engaged in the port of the diluent-containing bag.
Figure 3:
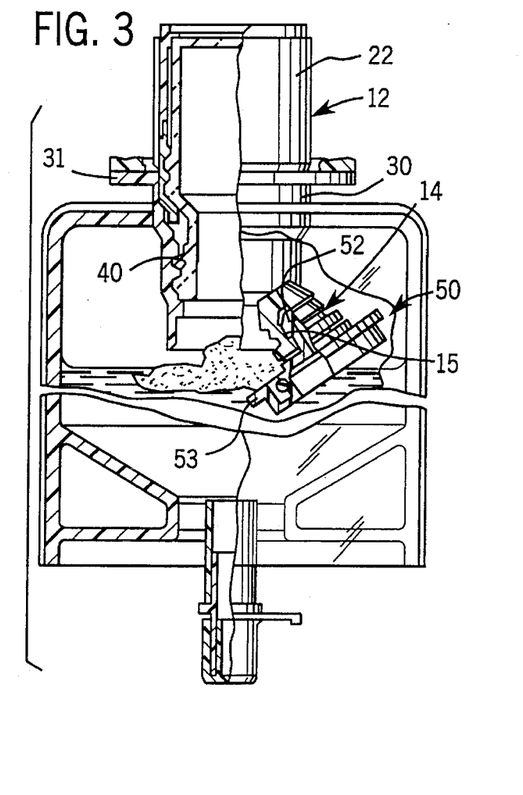
FIG. 3 is a view similar to FIG. 2 showing parts of the vial and bag manipulated to establish communication between the contents of the vial and the contents of the bag.

One combination of mating containers which may be assembled with the system of the present invention is illustrated in FIGS. 1–3. Such dual container systems are currently sold in the U.S.A. by Abbott Laboratories, Inc., One Abbott Park Road, Abbott Park, Ill. 60064-3500 U.S.A. as part of the ADD-Vantage® brand reconstituted drug system. Such container systems are disclosed in the Abbott Laboratories, Inc. U.S. Pat. Nos. 4,614,267, No.4,614,515, and No.4,757,911. The disclosures of those patents are incorporated herein by reference thereto to the extent pertinent and to the extent not inconsistent herewith.

Typically, one of the two containers is a glass vial 12 which contains an appropriate medicament in accordance with an individual prescription. The medicament in the vial 12 may be a solid (powder) or liquid, such as a highly concentrated drug. The vial medicament is provided as a precise, predetermined, quantity for mixing with a precise quantity of a diluent supplied in a diluent container 20 which is typically in the form of an I.V. bag containing a standard diluent, such as a normal saline solution or dextrose.

The vial 12 has an open end or neck which initially contains an internal, removable, resilient, seal plug or stopper 14. The stopper 14 defines an outwardly open recess 15, and the stopper 14 prevents the discharge, or removal, of the contents from the vial 12 unless and until the stopper 14 is engaged and removed in a certain manner by an appropriate mating structure, such as is incorporated in the diluent bag 20 as described in detail hereinafter.

The neck of the vial 12 also defines external threads 16 and is typically sealingly covered with a removable closure 18. The closure 18 is initially mounted over the vial neck and attached to a casing 22 surrounding the body of the vial 12. The casing 22 and the closure 18 are typically connected together via a frangible web. The closure 18 can be torn away from the body casing 22 by pulling on a ring 24 to break the frangible web. This permits removal of the closure 18 so as to expose the external threads 16 on the neck of the vial 12.

In a preferred form of the vial 12, the casing 22 also defines a plurality of circumferentially disposed, outwardly projecting, teeth 26 for engaging mating teeth on the bag 20 and preventing removal of the vial 12 after the bag and vial have been properly assembled.

The bag 20 has a body portion which is preferably fabricated from a conventional, flexible, transparent, thermoplastic material. The bag 20 normally is furnished to a hospital or other user with a supply of liquid diluent sealed therein.

The bag 20 includes a neck 30 which is stiffer than the flexible body portion. The neck 30 has a peripheral flange 31. The neck 30 also defines a port 38 (FIG. 1) opening to the bag interior. The port 38 is initially occluded with an outer closure 32 that is connected to the neck 30 with a frangible membrane. The outer closure 32 can be torn away from the bag neck 30 by pulling on an attached ring 34, and this exposes the port 38 for permitting the vial 12 to be coupled to the neck 30.

To this end, the bag neck 30 includes internal threads 40 (FIGS. 2 and 3) for mating with the threads 16 on the neck of the vial 12. Further, to prevent removal of the vial 12 after assembly with the bag 20, the bag neck 30 also includes an array of inwardly projecting teeth 44 which are circumferentially disposed on the interior of the port 38 and which are adapted to engage the teeth 26 on the vial casing 22. The vial teeth 26 and the bag teeth 44 have coacting, angled, cam surfaces for accommodating movement of the teeth past each other when the vial 12 and bag 20 are screwed together. Such movement is facilitated by some degree of resiliency in the mating container structures, primarily in the vicinity of the vial teeth 26 and bag teeth 44. However, the vial teeth 26 and the bag teeth 44 also define engaging surfaces which are substantially radially oriented and which effectively engage to prevent rotation in the unthreading or unscrewing direction.

Inside the bag neck 30 there is an inner plug 50 (FIGS. 2 and 3) with an upwardly projecting member 52. As the vial 12 and bag 20 are screwed together, the projecting member 52 is driven into engagement with the vial seal stopper 14 in the recess 15. Next, the bag plug 50 is manually grasped from the bottom of the bag neck 30 by pushing the flexible walls of the bag 20 against the plug 50. The plug 50 preferably includes an outwardly projecting flange 53. The flange 53 can be grasped through the walls of the bag 20, and the plug 50 can be pulled out of the bag neck 30. This causes the projecting member 52 of the plug 50 to also pull the engaged seal stopper 14 out of the neck of the vial 12. The engaged stopper 14 and plug 50 then drop together to the bottom of the bag 20 as illustrated in FIG. 3.

After the stopper 14 and plug 50 have been dislodged from the necks of the bag 20 and vial 12, the medicament from the vial 12 falls or flows into the bag 20. The flexible bag 20 may then be kneaded or otherwise manipulated to effect a thorough mixing so as to produce a reconstituted mixture having a much lower concentration. The lower concentration is determined, of course, by the initial amount of the concentrated medicament in the vial 12 and by the initial amount of diluent in the bag 20.

At the end of the bag 20, opposite the neck 30, there is a discharge structure or dispensing fitment 60. The dispensing fitment 60 includes a suitable tube 62, such as a rigid, thermoplastic tube which projects from the bottom of the bag 20. The tube 62 extends through the flexible wall of the bag 20, and the bag wall is sealed around the periphery of the tube 62. This seal may be effected with conventional heat seal techniques, with adhesive, or by other means, the details of which form no part of the present invention. The distal end of the tube 62 is provided with a suitable seal, closure, or manipulatable closure device to facilitate the withdrawing of the contents of the bag.

With the above-described type of dual container system, the proper threaded engagement is established by applying a predetermined, minimum torque. For example, in the above-identified ADD-Vantage® brand system, the preferred minimum torque is about 10 inch pounds. A novel process and apparatus have been developed according to the present invention for effecting proper assembly of the two containers and for establishing the desired torque in the threaded engagement. This process and apparatus permit a person to properly assemble many containers without tiring. The containers can be assembled at a relatively high rate so as to accommodate typical high volume applications in hospital pharmacies.

Figure 4:
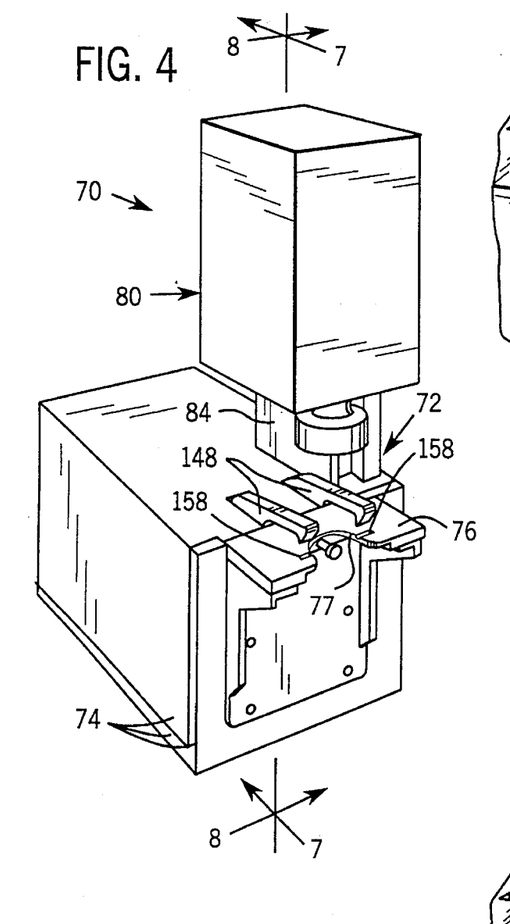
FIG. 4 is a simplified, perspective view of the apparatus of the present invention which is suitable for assembling the vial and bag.

The apparatus is designated generally by reference numeral 70 in FIG. 4. In the preferred embodiment, the apparatus 70 has a sufficiently compact configuration that accommodates placement on a table or counter in a hospital pharmacy or other work area.

The apparatus includes a frame 72 which includes a base 74 adapted to be supported on a horizontal surface. The base 74 defines a generally hollow housing for containing various mechanisms described in detail hereinafter, and the top portion of the base 74 defines a platform 76 extending outwardly from the vertical portion of the frame 72. The platform 76 is adapted to receive and support the bag 20 (FIG. 3) with the vial 12 initially disposed thereon. The bag 20 is received in a concave opening or saddle 77 defined by the platform 76.

Figure 5:
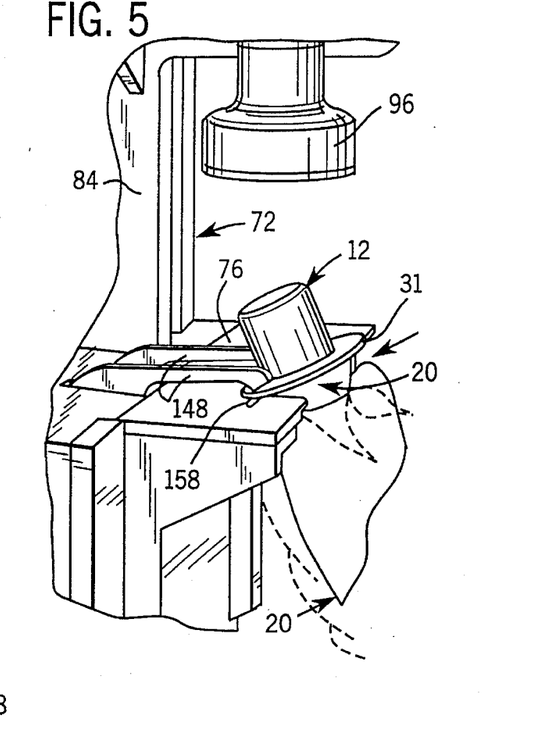
FIG. 5 is an enlarged, fragmentary, perspective view showing a partially assembled vial and bag being inserted into, and positioned on, the apparatus.
Figure 6:
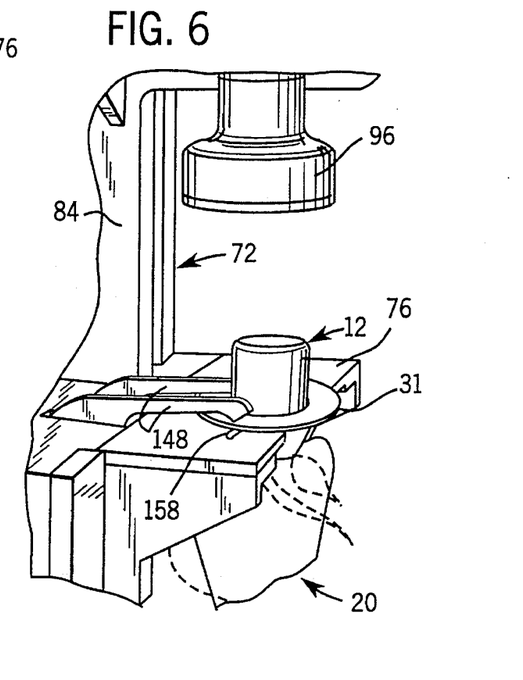
FIG. 6 is a view similar to FIG. 5 showing the partially assembled vial and bag fully positioned in the apparatus.

In the preferred manner of using the apparatus 70, the diluent bag cap 32 and the vial cap 18 are first removed while being careful to maintain the sterility of the exposed surfaces. Then, with one hand, the diluent container bag 20 is held with the fingers below the flange 31 around the neck 30. The base of the vial 12 is grasped with the other hand and partially threaded into the port 38 of the bag 20 by turning the vial clockwise about ¼ turn to engage the threads. The partially assembled containers are then placed on the apparatus support platform 76 as illustrated in FIGS. 5 and 6.

The apparatus 70 includes a torque-applying assembly 80 which is disposed on the vertical portion of the frame 72. In particular, the torque-applying assembly 80 includes a vertically disposed column or carriage 84 which is slidably received in a linear bearing on the vertical portion of the frame 72 so as to accommodate vertical reciprocation of the carriage 84.

The torque-applying assembly includes an arm 88 (FIG. 7) cantilevered from the carriage 84. The arm 88 supports an electrically operated torque motor 90 which is operatively engaged with a drive shaft 92 projecting through, and downwardly below, the arm 88. Mounted to the shaft 92 is a conventional torque cone 96 which includes a resilient insert 98 (FIG. 8) for engaging the end of the inverted vial 12 (FIG. 9) and for effecting rotation of the vial 12 relative to the bag 20.

The vertical position of the torque-applying assembly 80 is automatically adjusted as necessary to effect engagement and disengagement of the torque cone 96 and vial 12. To this end, the torque-applying assembly carriage 84 is driven by a novel cam system contained within the base 74. Specifically, within the base 74 there is an operator, such as a conventional electric motor 108, which is operatively connected through a right angle drive 110 to a cam disk 120. A cam pin 130 projects from the cam disk 120 below the bottom of the carriage 84.

Before the apparatus 70 begins to operate, the pin 130 is at a "home" position at the maximum elevation on the circular path along which the pin 130 can be carried by the cam disk 120 when the motor 108 effects rotation of the cam disk 120. At the maximum elevation position of the pin 130, the carriage 84 is maintained at its maximum elevation so as to position the torque cone 96 at the maximum distance from the support platform 76. This permits mounting of the bag 20 and vial 12 on the support platform prior to operating the apparatus 70. In this position there is sufficient clearance between the support platform 76 and the torque cone 96 to accommodate a variety of different sizes of vials 12.

Figure 8:
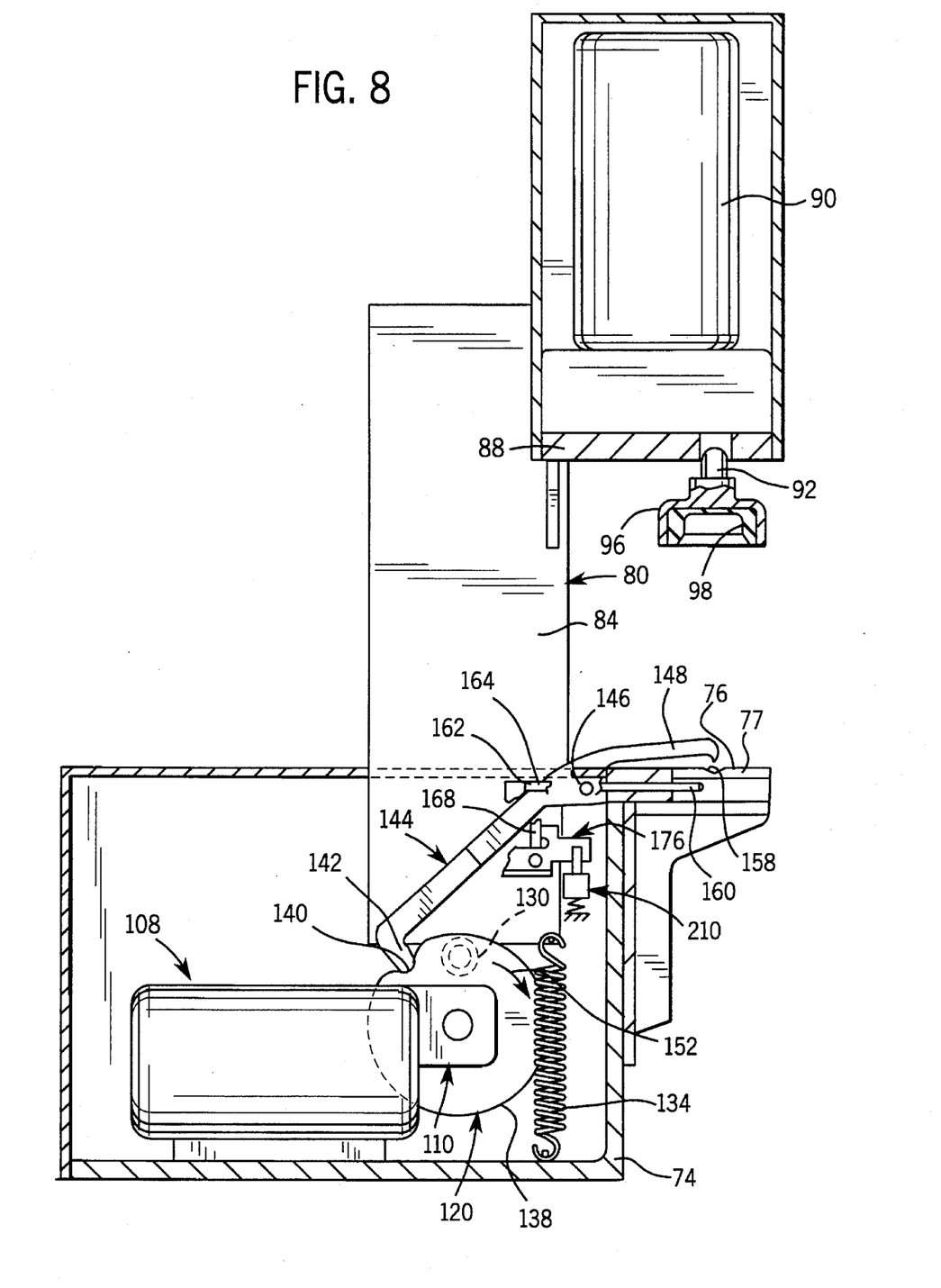
FIG. 8 is a partial, cross-sectional view taken generally along the plane 8—8 in FIG. 4.

As best illustrated in FIG. 8, a tension spring 134 is connected between the bottom of the base 74 and the lower end of the torque-applying assembly carriage 84. The spring 134 exerts a downward biasing force on the carriage 84 to insure that the torque-applying assembly 80 will be lowered when permitted to do so by rotation of the cam pin 130 to lower elevations.

Figure 7:
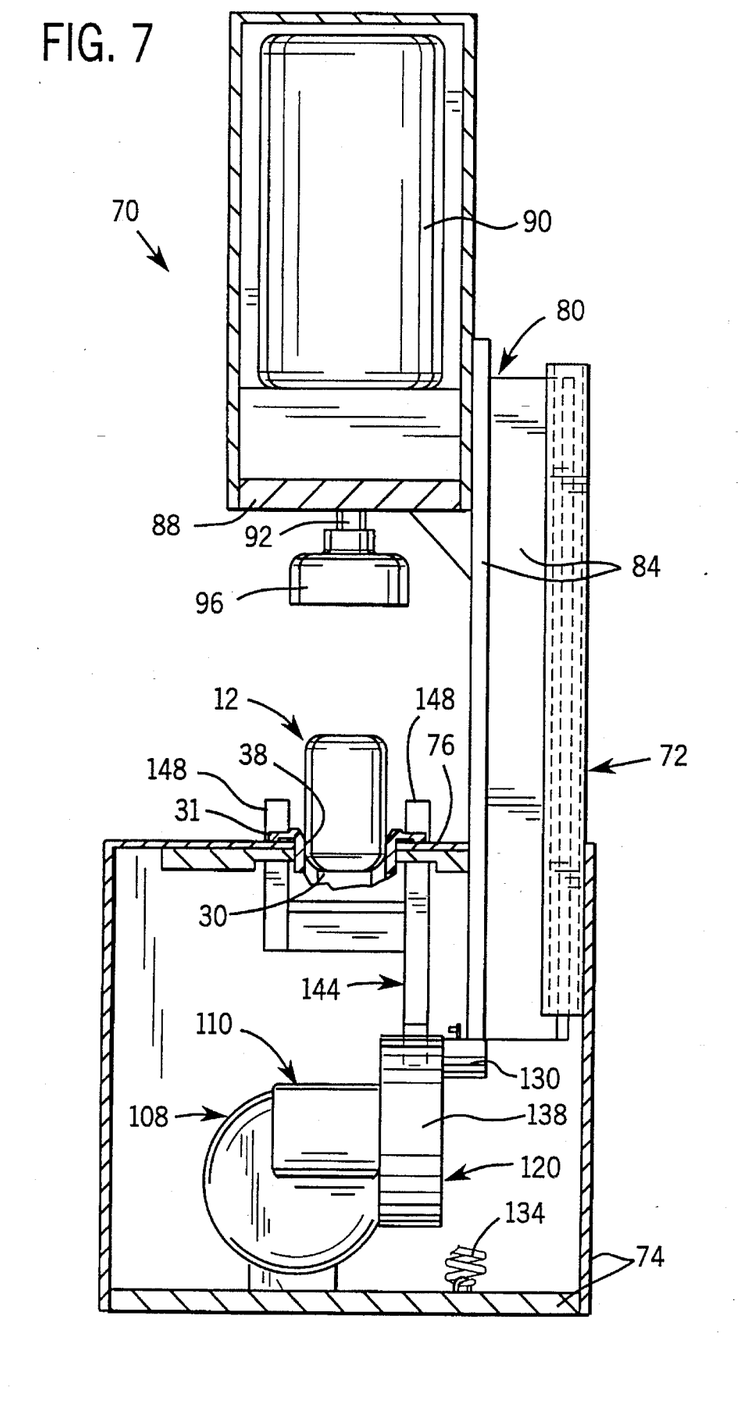
FIG. 7 is a fragmentary, partial cross-sectional view taken generally along the plane 7—7 in FIG. 4 with a portion of the vial and bag shown mounted in the apparatus.

As best illustrated in FIG. 8, the cam disk 120 defines a constant radius surface 138 which defines a major portion of the arc of a circle. The cam disk 120 also defines an arcuate recess 140 which extends radially inwardly from the constant radius surface 138. The recess 140 receives the cam follower end 142 of a gripper arm 144. The gripper arm 144 is pivotally mounted to the frame housing about a shaft 146 and has a gripper end defined by a pair of spaced-apart, gripper fingers 148. The gripper fingers 148 are adapted to engage the diluent container flange 131 on opposite sides of the port of the bag 20 (FIGS. 6 and 7).

A tension spring 149 is connected at an upper end to the cam follower end 142 of the gripper arm 144 and is connected at a lower end to the base 74. The gripper arm cam follower end 142 is thus biased with the tension spring 149 so as to normally be pulled into the cam disk recess 140 when the apparatus 70 is in the non-operating condition (FIG. 8). When the gripper arm cam follower end 142 is seated within the cam disk recess 140, the gripper fingers 148 are pivoted upwardly away from the support platform 76 as illustrated in FIG. 8. In this position, the gripper fingers 148 provide sufficient clearance for insertion or removal of the flange 31 of the bag 20. On the other hand, when the cam disk 120 is rotated by the motor 108 in the direction of the arrow 152 (FIG. 8), then the cam follower end 142 of the gripper arm 144 is forced outward by the constant radius surface 138 of the cam disk 120, and this pivots the gripper fingers 148 downwardly toward the support platform 76. In this manner the flange 31 of the bag 20 is pressed against the surface of the support platform 76 to a gripping position in which the bag 20 is firmly clamped to the apparatus 70. To further increase the clamping engagement, the upwardly facing surface of the support platform 76 is preferably provided with a V-shaped notch 158 on either side of the saddle opening 77 (FIGS. 4 and 8). In the clamping position, the fingers 148 are in registry with the notches 158 so as to slightly deform the flange 31 into the notches.

Figure 11:
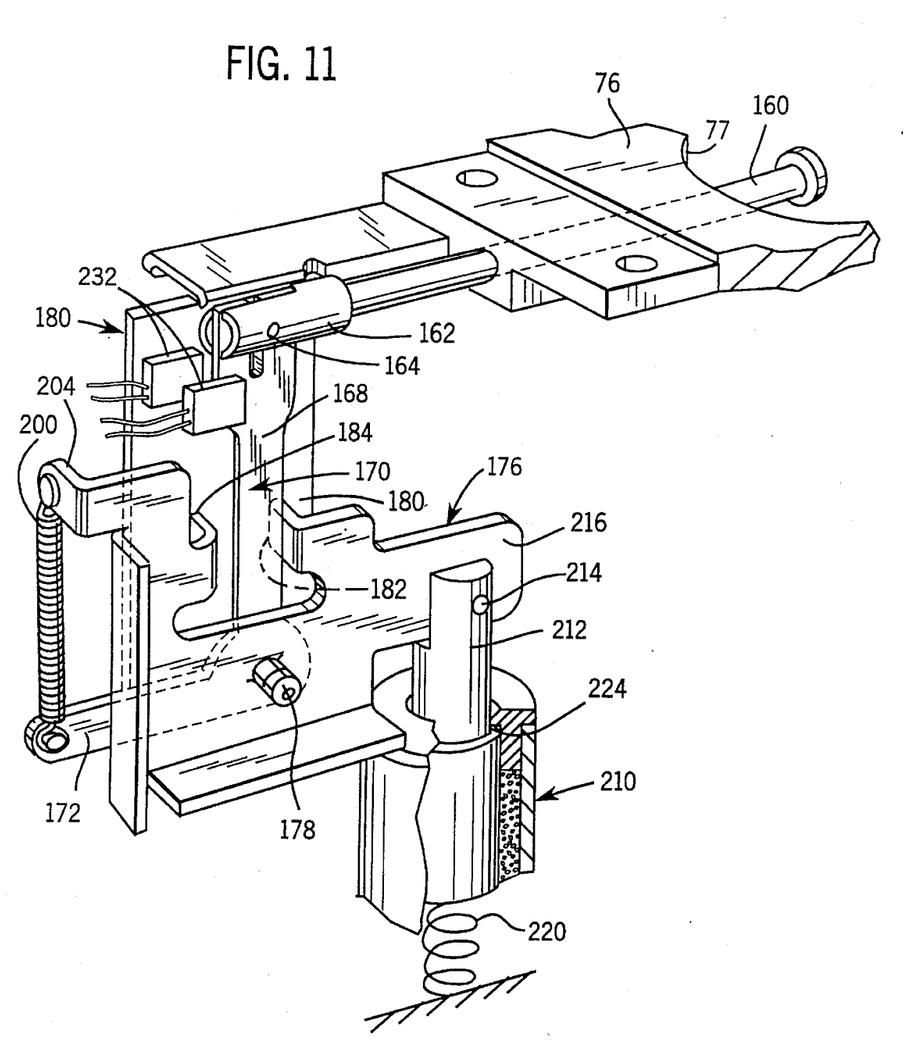
FIG. 11 is a greatly enlarged, fragmentary, perspective view of the rear portion of the bag clamping platform, ejector pin, and associated operating mechanisms shown unactuated in a rest position.

A switch and ejector assembly is provided for controlling the operation of the apparatus 70 and for ejecting the assembled vial 12 and bag 20 after full threading engagement has been established. As illustrated in FIG. 8, the ejector assembly includes an ejector pin 160 which extends through the front wall of the base 74 and projects outwardly into the saddle opening 77. As shown in FIG. 11, the rear end of the pin 160 is received in a fitting 162 which contains a pivot pin 164. The pivot pin 164 is received in a slot 166 in a first arm 168 of a link 170. The link 170 includes a rearwardly extending, lower arm 172, and the link 170 is pivotally mounted to a link plate 176 by means of a suitable pivot assembly 178. The pivot assembly 178 is mounted at a fixed location to a vertically disposed, rear frame member 180.

The link plate 176 includes an inwardly extending front tab 182 and an inwardly extending rear tab 184. The tabs 182 and 184 are spaced apart to define a gap larger than the width of the link first arm 168. In the non-operating, rest position illustrated in FIG. 11, the front tab 182 engages the front vertical edge of the first arm 170. However, the rear tab 184 is spaced rearwardly of the first arm 170 to provide a clearance. The clearance is sufficient to accommodate the rearward pivoting of the first arm 170 as the ejector pin 160 is pushed inwardly (in the direction of arrow 190 in FIG. 12) when a bag neck 30 is positioned at the support platform 76 in the saddle opening 77 (as shown in FIG. 12).

The ejector pin 160 is normally biased to project into the saddle opening 77 as illustrated in FIG. 11, and this is effected by a tension spring 200 which is connected at one end to the link second arm 172 and which is connected at the other end to an upper arm 204 at the top of the link plate 176. The spring 200 normally biases the link 170 for pivoting about the pivot assembly 178 to the rest position illustrated in FIG. 11 because the link plate 176 is normally prevented from pivoting in the non-operating condition of the apparatus by a de-energized, electric solenoid actuator 210.

The actuator 210 has an actuator rod 212 connected with a pivot pin 214 to a forwardly extending portion 216 of the link plate 176. In the non-operating condition, the solenoid actuator 210 is de-energized, and a compression spring 220 biases the solenoid actuator rod 212 to its upwardmost position as limited by the solenoid actuator body shoulder 224.

Figure 12:
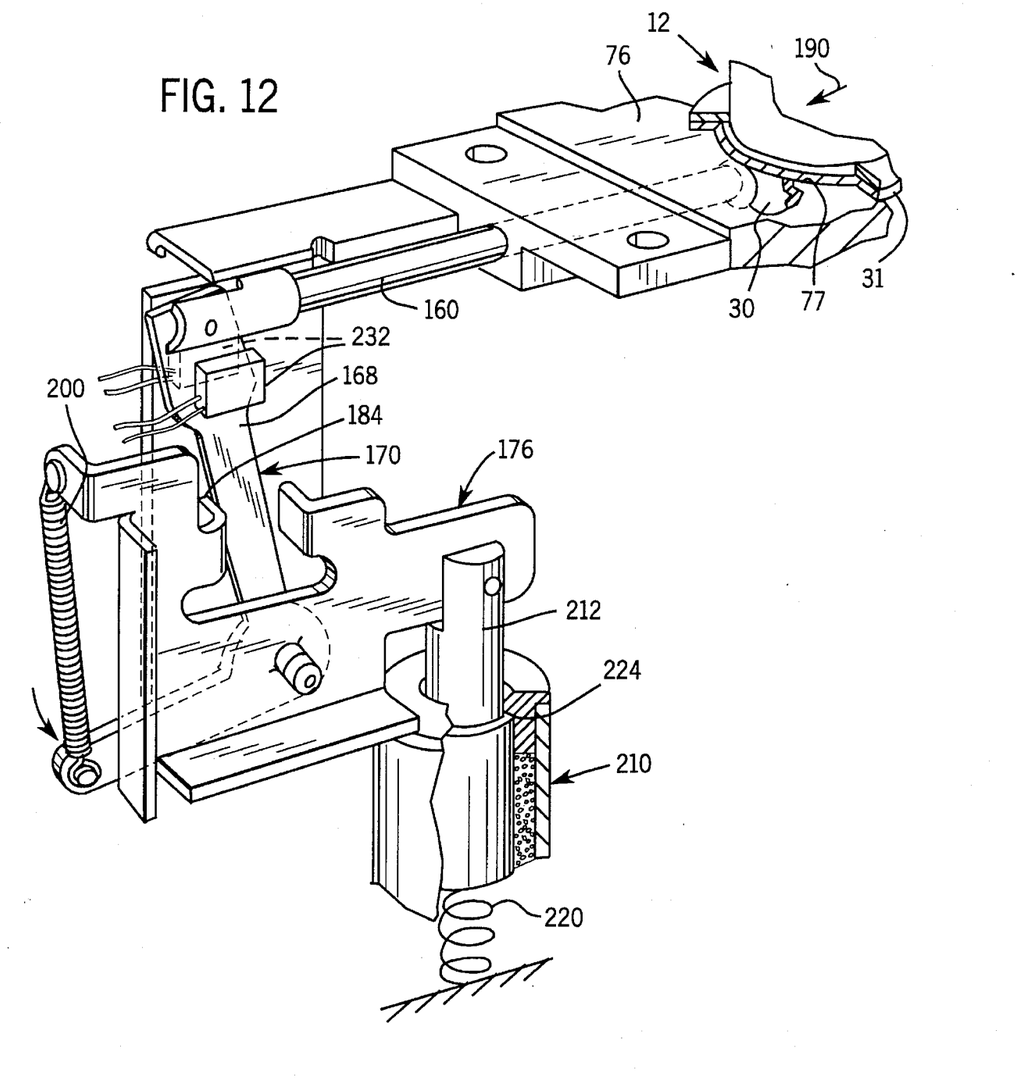
FIG. 12 is a view similar to FIG. 11 but shows the partially assembled vial and bag positioned on the support platform to depress the ejector pin.

When the diluent bag flange 31 is positioned on the support platform 76 with the vial 12 mounted therein as illustrated in FIG. 12, the ejector pin 160 is forced rearwardly. This causes the link 170 to pivot counterclockwise as viewed in FIG. 12 to overcome the tension of the spring 200. When the ejector pin 160 is fully depressed in the saddle opening 77, the link arm 168 is pivoted through the clearance region between the tabs 182 and 184 of the link plate 176 to a rearwardly angled position close to the tab 184.

Figure 13:
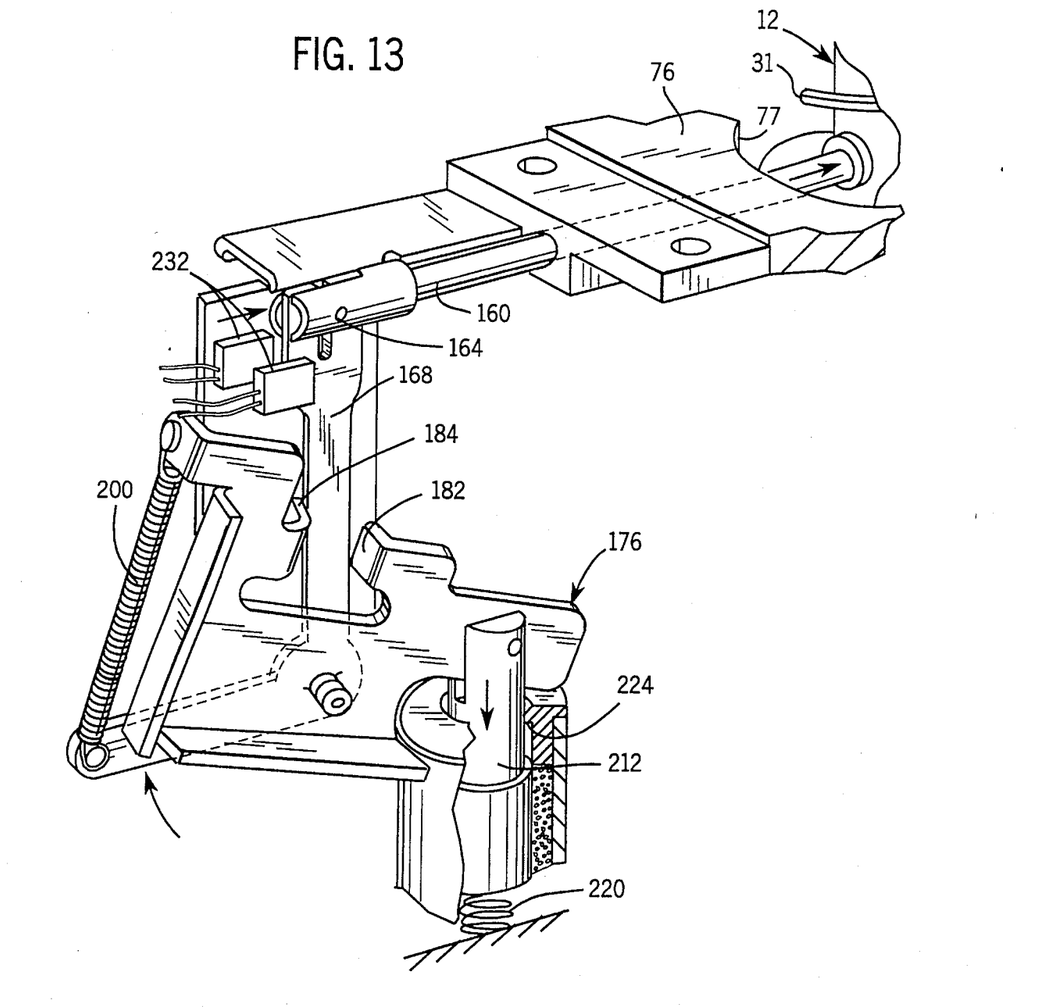
FIG. 13 is a view similar to FIG. 12 but shows the ejector pin actuated to eject the fully assembled vial and bag.

After the vial 12 has been fully threaded into the diluent container 20 and the gripper fingers 148 have been raised, the solenoid actuator 210 is energized. This pulls the solenoid actuator rod 212 downwardly to overcome the spring 220 and pivot the link plate 176 clockwise as viewed in FIG. 13. This engages the link plate tab 184 with the first link arm 168 to pivot the first link arm 168 in the clockwise direction as viewed in FIG. 13. This returns the link arm 168 to the substantially vertical orientation as illustrated in FIG. 13 so as to move the ejector pin 160 to the fully extended position in the saddle opening 77 and thereby eject the assembled bag and vial from the apparatus. When the solenoid actuator is de-energized, the solenoid spring 220 returns the solenoid actuator 210 to the elevated, de-energized position as illustrated in FIG. 11.

A conventional photocell sensor system 232 is mounted rearwardly of the vertical position of the first arm 168 of the link 170. When the ejector pin 160 is moved rearwardly by the placement of the bag and vial on the support platform 76 as shown in FIG. 12, the photocell switch system 232 is actuated. The signal from the switch system 232 can be employed to initiate operation of the apparatus. Further, if the bag and vial are inadvertently dislodged from the platform 76 during the assembly process, the ejector pin 160 will be pivoted forwardly (by spring 200) so as to move the link arm 168 away from the position actuating the switch system 232. The switch system 232 then returns to the unactuated position, and this can be used to automatically turn off the apparatus during such an abnormal event.

The preferred form of the method of the present invention will next be described with reference to a preferred operation of the apparatus 70. First, the threaded end of the vial 12 is manually disposed in the port of the diluent bag 20 and is rotated ¼ turn to initiate the threaded engagement. Then, as illustrated in FIG. 5, the partially assembled containers are slipped under the gripper arms 148, and the containers are positioned so that the bag flange 31 is properly seated on the support platform 76.

As the bag 20 is moved into position within the saddle opening 77, the bag port structure 30 contacts the distal end of the ejector pin 160 and forces the ejector pin 160 rearwardly. The link arm 168 connected to the rearwardly moving ejector pin 160 becomes located adjacent the photocell sensor system 232, and this results in the generation of a signal which starts the operation of the apparatus 70.

Initiation of the operation of the apparatus 70 results in the cam motor 108 and torque motor 90 starting simultaneously. Thus, the torque motor 90 begins rotating the torque cone 96 while the torque cone 96 is in the initially elevated position in axial alignment over the vial 12. The cam motor 108 begins to rotate the cam disk 120 in the clockwise direction as viewed in FIG. 8 so as to pivot the gripper fingers 148 downwardly to clamp the bag flange 31 against the support platform 76 (FIG. 6).

As the cam disk 120 continues rotating, the cam pin 130 at the bottom of the torque-applying assembly carriage 84 is carried downwardly. The torque-applying assembly carriage 84 rides downwardly on the pin 130, and the downward movement of the carriage 84 is assured by the tension spring 134.

Eventually, the torque-applying assembly carriage 84 moves downwardly sufficiently to bring the torque cone 96 into engagement with the inverted, bottom end of the vial 12. The rotating torque cone 96 grips the vial 12 and rotates the vial 12 relative to the fixed diluent bag 20.

As the torque cone 96 rotates the vial 12 to effect threaded engagement, the vial 12 and engaged torque cone 96 move downwardly into the port of the bag 20. The downward, threading movement of the vial 12 and torque cone 96 is accommodated by the downwardly moving torque-applying assembly 80. The downward movement of the torque-applying assembly 80 during the threading process is accommodated by the further downward movement of the pin 130 and is positively effected by the weight of the assembly 80 and the spring 134.

Figure 9:
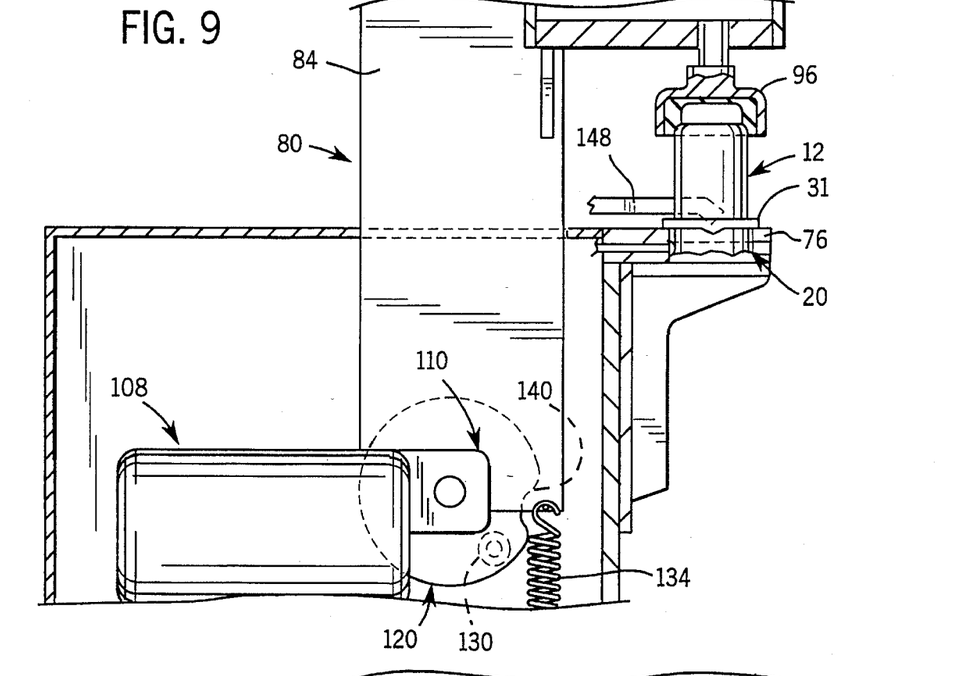
FIG. 9 is an enlarged, fragmentary, partial cross-sectional view similar to FIG. 8 but shows the apparatus engaged with the vial and bag after the full, threaded engagement between the vial and bag has been effected.

The cam disk 120 rotates at a sufficiently high speed that the pin 130 is carried out of engagement below the bottom end of the torque-applying assembly carriage 84 as illustrated in FIG. 9. The tension spring 134 exerts the sufficient force on the torque-applying assembly so that the torque cone 96 and vial 12 will move further downwardly as further threading engagement is effected.

The torque motor 90 is preferably a direct current electric motor with a control system for controlling the output torque in response to the voltage. The voltage can be set so as to stall the motor rotation at the voltage corresponding to a desired torque. For example, if the apparatus is employed to assemble the above-described ADD-Vantage® brand dual container system, then the motor control would be set to stall the motor 90 at a pre-determined, final torque. At this point, the motor 90 would cease rotating, and further threaded engagement of the vial 12 and bag 20 would terminate.

Figure 10:
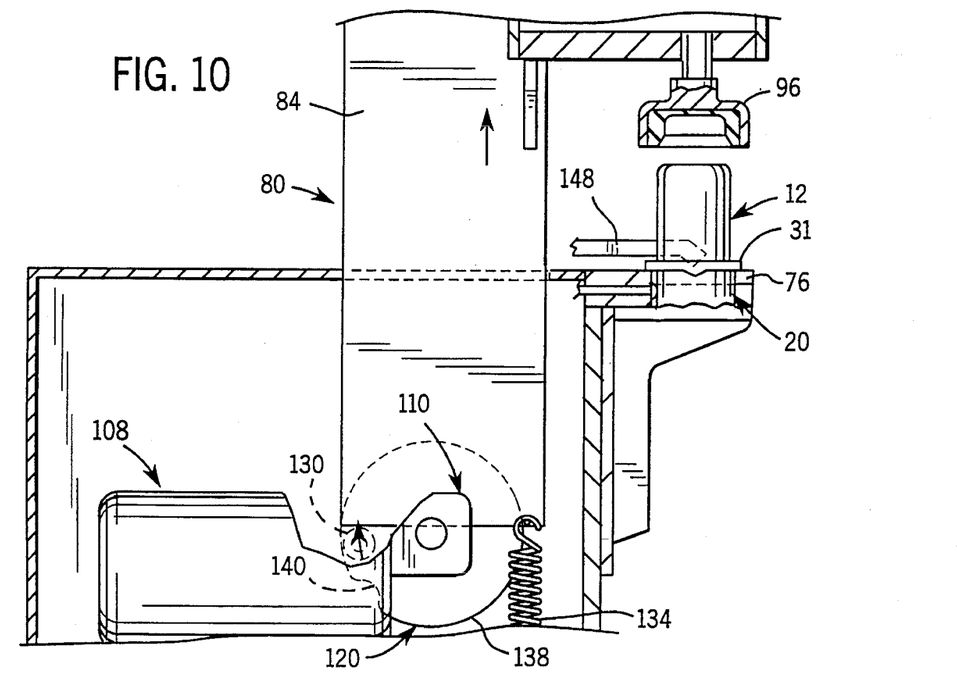
FIG. 10 is a view similar to FIG. 9 but shows a later stage of the operation of the apparatus wherein the apparatus is disengaged from the vial.

The cam motor 108 continues operating while the torque motor 90 is stalled, and eventually the continued clockwise rotation of the cam disk 120 carries the pin 130 upwardly against the bottom of the torque-applying assembly carriage 84 (FIG. 10) to elevate the torque cone 96 away from the vial 12. When the torque cone 96 is free of the vial 12, the torque cone begins rotating again, and the carriage 84 continues being moved to its home position at the maximum elevation illustrated in FIG. 8. At that point, the cam follower 142 of the gripper arm 144 is received in the cam recess 140 to pivot the gripper arm 148 upwardly to release the assembled vial and bag.

The control system de-energizes the cam motor 108 when the cam disk 120 has returned to the initial "home" position. The control system then also energizes the solenoid 210 for a predetermined, short period of time so as to drive the ejector pin 160 forwardly and push the assembled vial and bag off of the platform 76 and onto a receiving table (not illustrated). The solenoid actuator 210 is then de-energized, and it returns to its upwardly biased rest position while the ejector pin is maintained in the projecting orientation illustrated in FIG. 11.

The control system can be provided to prevent operation of the apparatus 70, or to terminate its operation, if the bag 20 is not properly seated on the support platform 76 to press the ejector pin 160 inwardly. In particular, when the ejector pin 160 is pressed inwardly (FIG. 12), the photocell sensor switch system 232 is actuated by the link arm 168 as previously described. The control system permits operation of the torque motor 90 and cam motor 108 only when the sensor switch system 232 is actuated by the rearward position of the link arm 168. Thus, during the threading process, if the bag 20 falls away, or is otherwise removed, from the support platform 76, then the link arm 168 will be returned (by the force of spring 200) to the position illustrated in FIG. 13 wherein the link arm 168 no longer actuates the sensor switch system 232. Failure to maintain the signal from the :sensor switch system 232 will then de-energize the torque motor 90 and cam motor 108.

Normally, the torque motor 90 will properly screw the vial 12 into the bag 20 and will stall out at the predetermined torque setting as previously described. However, the control system can be provided to accommodate situations where the containers do not properly thread together.

In particular, a conventional encoder wheel (not visible in the Figures) can be provided on the torque motor 90. The encoder wheel, in cooperation with a conventional timing system, can be used to determine when the torque motor 90 has stalled. For a given dual container assembly, a normal time period required for the torque motor 90 to engage the vial and establish a fully threaded connection with the bag 20 can be determined (by experiment). For example, for one type of dual container system, a fully threaded connection at 10 inch-pounds of torque might be normally established between 0.7 and 0.8 seconds following energization of the motor 90. The 0.1 second interval can be regarded as the "stall interval" during which the motor 90 will stall and rotation will stop.

The control system senses whether or not the encoder wheel is still rotating at the end of the stall interval. If the rotation of the encoder wheel stops during the stall interval as would be expected for a fully threaded condition at 10 inch-pounds of torque, then the cam motor 108 continues to rotate until the torque cone 96 is raised to the elevated, home position. At that point, the gripper fingers are raised, the assembled containers are ejected by the pin 160, and both motors 108 and 90 are turned off.

If the rotation of the encoder wheel does not stop during the stall interval, then that is an indication that proper threading process has not been completed. The control system then continues to operate the torque motor 90. The control system also continues to operate the cam motor 108, but at a slower rotational speed than previously. This will insure that the torque cone assembly 96 remains engaged with the bottom of the vial 12 for a longer period of time so that the torque motor 90 can continue rotating for an additional, "try again" time interval (e.g., 0.1 second) in an effort to establish the fully threaded engagement of the vial 12 and bag 20 at 10 inch-pounds of torque.

If the proper threaded engagement is finally established during the additional time interval, then the torque motor 90 will stall as described above, and the apparatus 70 will then continue to operate as previously described. However, if the encoder wheel rotation still does not terminate within the additional time interval, then that is an indication that the containers are still not being properly threaded together. In that case, the control system then automatically de-energizes both the cam motor 108 and the torque motor 90. The operator must then remove the improperly threaded vial 14 and bag 20. The operator can then reset the apparatus 70 and reposition the vial 14 and bag 20 on the platform 76 so that the threading operation can be performed again.

The apparatus 70 can assemble a variety of containers having different sizes. When very short vials 12 are processed, the torque-applying assembly 80 must be moved downwardly closer to the support platform 76 than when longer vials are processed. Thus, the size of the cam disk 120, speed of the cam disk rotation, and the rotational speed of the torque motor 90 are selected to provide sufficient time for engagement of the vial and bag during the threading process before torque cone 96 is subsequently raised away from the vial.

When the apparatus 70 is employed to assemble the above-identified ADD-Vantage® brand dual container system, the time required to establish a fully threaded assembly is very short—typically about two seconds.

The novel process and apparatus of the present invention can thus accommodate high volume applications wherein many dual container units must be assembled. The system functions substantially automatically, with a minimum amount of human intervention, and at a relatively low cost.

The system assembles the containers with a predetermined torque and functions effectively to consistently provide the same, final torque to each dual container assembly.

It will be readily apparent from the foregoing detailed description of the invention and from the illustrations thereof that numerous variations and modifications may be effected without departing from the true spirit and scope of the novel concepts or principles of this invention.

What is claimed is:

1. Apparatus for assembling a relatively rigid medicant container having a threaded end and a diluent container having a flexible body portion and a mating, threaded receiving port surrounded by a relatively rigid laterally extending flange, said apparatus comprising:

a frame and a clamp assembly which includes a support platform extending from said frame, the platform having a concave opening therein for receiving said port, with the support platform engaging and supporting said flange adjacent said port of said diluent container, and gripping fingers disposed on opposite sides of said opening and pivotally mounted to said frame, said fingers pivotable in a first direction toward said platform to press the flange against the platform in a first gripping mode of the assembly to prevent rotation of the diluent container, said fingers pivotable in a second direction away from said platform to release themselves from said flange in a second release made of the assembly;

a torque-applying assembly disposed on said frame and in cooperative relationship with said platform for engaging and rotating said medicant container in said port of said diluent container while said flange is pressed by the gripping fingers to effect threaded engagement of said containers; and an operator and a cam rotated thereby which engages said torque-applying assembly and produces relative movement between said torque-applying assembly and said frame such that said torque-applying assembly is moved away from said platform to effect sequential engagement and disengagement of said torque-applying assembly and said medicant container.

2. The apparatus in accordance with claim 1 further including a first electric motor in said torque-applying assembly for rotating said medicament container;

a second electric motor in said operator for rotating said cam;

a member biased outwardly on said frame in the absence of said diluent container for being pushed inwardly by said diluent container when said diluent container is gripped by said clamp assembly;

a normally open switch closable by the inward movement of said member; and control circuit means for preventing energization of both of said electric motors when said switch is open.

3. The apparatus in accordance with claim 1 in which said frame includes a base adapted to be supported on a horizontal surface; and said torque-applying assembly is mounted on said frame for vertical, reciprocating motion relative to said frame.

4. The apparatus in accordance with claim 1 in which said clamp assembly includes another cam operatively engaged with said gripping arm.

5. The apparatus in accordance with claim 1 in which said operator for rotating said cam includes an electric motor.

6. The apparatus in accordance with claim 1 in which said torque-applying assembly includes a rotatable torque cone with a resilient insert for engaging said medicament container and an electric motor operatively engaged with said torque cone for rotating said torque cone.

7. The apparatus in accordance with claim 1 further including an ejector member for engaging a side of said diluent container and an actuator for moving said ejector member between (1) a retracted position for accommodating said diluent container on said clamp assembly and (2) an extended position for pushing said diluent container out of said clamp assembly when said clamp assembly is in said open configuration.

8. The apparatus in accordance with claim 1 in which said torque-applying assembly includes (1) a column mounted in a linear bearing to said frame, (2) an arm cantilevered from said column, (3) an electrically-operated torque motor mounted on said arm, and (4) a torque cone operatively driven by said torque motor.

9. The apparatus in accordance with claim 1 further including a tension spring connected between said torque-applying assembly and said frame to bias said torque-applying assembly toward said clamp assembly.

10. The apparatus in accordance with claim 1 further including a control system for controlling both said torque-applying assembly and said cam operator, said control system including a normally open switch which is actuated when said diluent container is positioned in said clamp assembly and initiates operation of said torque-applying assembly and said cam operator.

* * * * *